Patented Apr. 25, 1939

2,156,093

UNITED STATES PATENT OFFICE 2,156,093

PROCESS OF PREPARING VINYL ESTERS

Heinrich Lange and Otto Dorrer, Frankfort-on-the-Main-Hochst, Germany, assignors to I. G. Farbenindustrie Aktiengesellschaft, Frankfort-on-the-Main, Germany No Drawing. Application February 20, 1936, Serial No. 64,931. In Germany February 28, 1935

8 Claims. (Cl. 260—498)

The present invention relates to a process of preparing vinyl esters.

From U. S. Patent 1,912,608 dated June 6, 1933, in the name of Walter Weibezahn, it is known to prepare vinyl esters by the action of acetylene on carboxylic acids in the presence of mercury compounds and of borontrifluoride. In U. S. Patent 2,021,873 dated November 19, 1935, in the name of Otto Nicodemus and Walter Weibezahn, the process is modified in such a manner that also hydrogen fluoride is present during the reaction.

Now we have found that substantial advantages are obtained in the preparation of vinyl esters by using as a catalyst the finished complex acid, namely borontrifluoride-acetic acid, besides mercury compounds. The complex of borontrifluoride-acetic acid seems to be especially suitable because it is distinguished by a particular stability at the reaction temperature favorable for the preparation of vinyl esters. The borontrifluoride-acetic acid may, therefore, be used with surprisingly favorable results for the preparation of vinyl esters of organic acids other than acetic acid, for instance, crotonic acid, lauric acid, meth-thioglycolic acid or the like. Not only the yield of vinyl ester increases but there is obtained, above all a much greater yield in the unit of space and time. It may be desirable to add the already formed borontrifluoride-acetic acid in such a manner that the complex acid is dissolved in the organic acid which forms the complex, for instance, in anhydrous glacial acetic acid, and that this solution of a known content is added to the reaction mixture. The reaction products are then worked up according to the process described in U. S. Patent 1,912,608 dated June 6, 1933, in the name of Walter Weibezahn.

The addition of hydrogen fluoride to the reaction mixture described in U. S. Patent 2,021,873 dated November 19, 1935, in the name of Otto Nicodemus and Walter Weibezahn, may also be applied in the above described method of operation.

As aliphatic monocarboxylic acids there may be used for instance: formic acid, propionic acid, butyric acid, crotonic acid, lauric acid, methoxy acetic acid, meth-thioglycolic acid. During the reaction the mercury compound used is transformed into the salt of the corresponding aliphatic carboxylic acid.

The following examples serve to illustrate the invention but they are not intended to limit it thereto; the parts are by weight:

1. 100 parts of crotonic acid to which there are added 4.2 parts of mercuric oxide and 4.65 parts of a solution of 16.6 per cent strength of borontrifluoride-acetic acid in glacial acetic acid are treated at 60° C. while vigorously stirring with acetylene until the absorption decreases. After neutralization with anhydrous sodium acetate, the crude vinyl ester is distilled. After deacidification with sodium bicarbonate and rectification the pure vinyl ester (boiling point 24.5° C. to 25.5° C. under a pressure of 9.5 millimeters) is obtained with a yield of 44 per cent of the theoretical (calculated upon the acetylene absorbed). 70 per cent of the crotonic acid used in this process have entered into reaction with acetylene.

2. 100 parts of lauric acid to which there are added 5 parts of mercuric oxide and 0.62 part of pure borontrifluoride-acetic acid are treated at 60° C., while vigorously stirring, with acetylene. After the addition of anhydrous sodium acetate the whole is distilled and after rectification there is obtained the vinyl ester which boils at 105° C. to 112° C. under a pressure of 2 to 3 millimeters of mercury. The yield amounts to 26 per cent of the theoretical (calculated upon the acetylene absorbed).

3. To 100 parts of meth-thioglycolic acid there are added 5.6 parts of mercuric oxide and 0.4 part of borontrifluoride-acetic acid and the whole is treated at 80° C., while vigorously stirring, with acetylene. A violent reaction with acetylene sets in. After a few hours more than half of the acid used enters into reaction. After anhydrous sodium acetate has been stirred in, the vinyl ester is distilled at 50° C. to 55° C. under a pressure of 9.5 millimeters of mercury, deacidified with sodium bircarbonate and rectified. The yield of pure ester amounts to 50 per cent of the theoretical calculated upon the acetylene absorbed.

4. 100 parts of formic acid to which have been added 0.5 part of mercuric oxide and 0.085 part of pure borontrifluoride-acetic acid are treated at 10° C. to 15° C. with acetylene. After anhydrous sodium acetate has been stirred in, the crude vinyl ester is distilled, washed with ice water and rectified. The boiling point of the vinyl ester obtained is 45° C. and the yield amounts to 54 per cent of the theoretical calculated upon the acetylene absorbed.

5. 100 parts of methoxy acetic acid to which have been added 1.5 parts of mercuric oxide and 1.65 parts of a solution of 40 per cent strength of borontrifluoride acetic acid in glacial acetic acid are treated at 35° C. with acetylene. After the addition of anhydrous sodium acetate, the vinyl ester is distilled and rectified. It boils at 37° C. to 38° C. under a pressure of 12 millimeters. The yield amounts to 70 per cent of the theoretical calculated upon the acetylene absorbed.

6. To 100 parts of propionic acid there are added one part of mercuric oxide, 0.65 part of pure borontrifluoride-acetic acid and 0.05 part of anhydrous hydrofluoric acid. Acetylene is introduced into this mixture at 27° C. to 30° C., while vigorously stirring. After neutralization with anhydrous sodium propionate, the crude vinyl ester of the propionic acid is distilled, de-acidified with sodium bicarbonate and rectified. The ester boils at 34° C. to 35° C. under a pressure of 70 millimeters. The yield amounts to 65 per cent of the theoretical calculated upon the acetylene absorbed.

7. 100 parts of butyric acid to which there are added 1.65 parts of mercuric oxide, 0.65 part of pure borontrifluoride-acetic acid and 0.03 part of anhydrous hydrofluoric acid are treated at 25° C. to 30° C. with acetylene. Anhydrous sodium acetate is then stirred in and the vinyl ester of the butyric acid is obtained by distillation. This ester boils at 21° C. to 23° C. under a pressure of 13 millimeters; the yield amounts to 55 per cent of the theoretical (calculated upon the acetylene absorbed).

We claim:

1. The process which comprises acting with acetylene upon aliphatic monocarboxylic acids other than acetic acid in the presence of a mercury compound promoting the reaction with addition of borontrifluoride-acetic acid.

2. The process which comprises acting with acetylene upon aliphatic monocarboxylic acids other than acetic acid in the presence of a mercury compound promoting the reaction with addition of borontrifluoride-acetic acid and of hydrogen fluoride.

3. The process which comprises acting with acetylene upon lower aliphatic monocarboxylic acids other than acetic acid in the presence of a mercury compound promoting the reaction with addition of borontrifluoride-acetic acid.

4. The process which comprises acting with acetylene upon lower aliphatic monocarboxylic acids other than acetic acid in the presence of a mercury compound promoting the reaction with addition of borontrifluoride-acetic acid and of hydrogen fluoride.

5. The process which comprises acting with acetylene upon lower aliphatic monocarboxylic acids other than acetic acid in the presence of mercuric oxide with addition of borontrifluoride-acetic acid and of hydrogen fluoride.

6. The process which comprises acting with acetylene upon crotonic acid in the presence of mercuric oxide with addition of borontrifluoride-acetic acid.

7. The process which comprises acting with acetylene upon formic acid in the presence of mercuric oxide with addition of borontrifluoride-acetic acid.

8. The process which comprises acting with acetylene upon methoxy-acetic acid in the presence of mercuric oxide with addition of borontrifluoride-acetic acid.

HEINRICH LANGE.
OTTO DORRER.